United States Patent [19]

Williatte et al.

[11] Patent Number: 5,037,616
[45] Date of Patent: Aug. 6, 1991

[54] DEVICE FOR INJECTION OF A HYDROCARBON FEEDSTOCK INTO A CATALYTIC CRACKING REACTOR

[75] Inventors: Christophe Williatte, Paris; Jean-Bernard Sigaud, Vaucresson; Thierry Patureaux, Montivilliers; Roben Loutaty, Le Havre, all of France

[73] Assignee: Compagnie de Raffinage et de Distribution Total France, Levallois-Perret, France

[21] Appl. No.: 209,647

[22] Filed: Jun. 21, 1988

[30] Foreign Application Priority Data

Oct. 14, 1987 [FR] France ............................... 87 14194

[51] Int. Cl.$^5$ ............................................... B01J 8/18
[52] U.S. Cl. ............................... 422/140; 239/398; 239/590; 239/597; 422/224
[58] Field of Search ............... 422/140, 145, 224, 127; 196/135, 128, 126, 127; 208/157; 239/398, 432, 590, 597, 599

[56] References Cited

U.S. PATENT DOCUMENTS

| 945,899 | 1/1910 | Achee | 239/398 |
|---|---|---|---|
| 1,753,443 | 4/1930 | Murray | 239/597 |
| 1,889,201 | 11/1932 | Holveck | 239/597 |
| 2,786,742 | 3/1957 | McKinley et al. | 422/140 |
| 2,891,000 | 6/1959 | Metrailer | |
| 2,978,189 | 4/1961 | Metz et al. | 239/597 |
| 2,994,659 | 8/1961 | Slyngstad et al. | |
| 3,240,253 | 3/1966 | Hughes | |
| 3,654,140 | 4/1972 | Griffel et al. | 208/157 |
| 4,405,444 | 9/1983 | Zandona | 208/157 |
| 4,434,049 | 2/1984 | Dean et al. | |
| 4,523,987 | 6/1985 | Penick | |
| 4,816,134 | 3/1989 | Knopp et al. | 208/157 |
| 4,853,189 | 8/1989 | Holland | 422/140 |

Primary Examiner—Joye L. Woodard
Attorney, Agent, or Firm—Curtis, Morris & Safford

[57] ABSTRACT

A device for injection of a hydrocarbon feedstock into a catalytic cracking reactor comprising, from upstream to downstream in the direction of flow of the feedstock, an intake and mixing system (5) for the liquid hydrocarbon feedstock and steam, a venturi tube (6) whose entrance cone (10) is joined to said intake and mixing system (5), and a protective cap (7) that is integral with the discharge cone (14) of the venturi tube and is provided with an orifice (16) for injection of the feedstock into the reactor. The dimensions of the venturi tube (6) are such that the velocity of the mixture of liquid feedstock and steam attains therein sonic conditions at the level of the throat (13), and the rectilinear throat located between the discharge cone (14) and the entrance cone (10) is connected to such cones continuously by a curved section without making an angle exceeding about 5 degrees and about 15 degrees, respectively, with the axis of the venturi tube.

17 Claims, 2 Drawing Sheets

DEVICE FOR INJECTION OF A HYDROCARBON FEEDSTOCK INTO A CATALYTIC CRACKING REACTOR

The present invention relates to a device for injection of a hydrocarbon feedstock into a catalytic cracking reactor, and more particularly one of the fluidized-bed type.

BACKGROUND OF THE INVENTION

In fluidized-bed catalytic cracking processes, known in the art as fluid catalytic cracking (FCC) processes, the hydrocarbon feedstock is injected into a reactor in the form of a column in which the catalyst is maintained in suspension and flows either in an essentially ascending stream (in which case the reactor is called a riser) or in a descending stream (in which case the reactor is called a dropper).

For greater clarity, what follows will refer to the case of ascending-flow reactors, but it will be obvious to one skilled in the art that it might just as well refer to descending-flow reactors; and the feedstock injectors which are the object of the present invention should be understood to be applicable to both reactor types.

In a riser, the regenerated catalyst is introduced at the base of the reactor in a fluidized and hot state (at from 650° to 850° C.) at the same time as a suspending gas below the zone of injection of the hydrocarbon feedstock. The latter is introduced into the reactor substantially in the liquid state and at a temperature ranging from 80° to 300° C.

Between the zone of injection of the feedstock and the top of the reactor, the catalyst gives up some of its heat energy to the feedstock, which is then vaporized and cracked into light hydrocarbons. This has the effect of rapidly increasing the volume of the gases, which then transport the catalyst at an accelerated rate to the top of the reactor, where it is separated from the hydrocarbons. At the outlet of the riser, the mixture of hydrocarbons and catalyst particles attains an equilibrium temperature which usually ranges from 470° to 530° C.

In the course of these operations, a small portion of the feedstock (generally from 3 to 12 weight percent) forms a solid hydrocarbon deposit or "coke" on the catalyst particles which reduces the catalytic activity of the catalyst and limits the conversion of the feedstock to upgradable products. The catalyst therefore has to be regenerated by burning off this coke deposit before it is reintroduced into the reactor for a new cracking cycle.

The deposition of coke on the catalyst generally is the more severe the heavier the injected feedstock is and the more difficult it therefore is to vaporize. The unvaporized fractions then form on the catalyst a film composed mainly of coke and heavy hydrocarbons.

With a view to limiting this process, it is therefore important to prevent the liquid fractions of the hydrocarbon feedstock from coming into contact with the catalyst before they are vaporized and then cracked, and it is therefore necessary to reduce the duration of vaporization of the feedstock.

Moreover, it is well known in the art that it is advisable to inject the feedstock to be treated into the reactor at high velocity and in the form of very fine droplets. (See U.S. Pat. No. 2,891,000 and 2,994,659.)

To this end, it has been proposed to employ feedstock injectors comprising a venturi tube. (See French patent 2,102,216, U.S. Pat. Nos. 3,240,253 and 4,523,987, and European patent 157,691.) However, this approach poses many problems when used for injection into fluidized-bed reactors. In fact, the velocities at the level of the throat of the venturi tube give rise to the separation of fluid stream lines from the walls of the injector, the formation of backflow currents, and the penetration of catalyst particles into the injector, resulting in marked erosion of the injector and rapid deterioration of performance.

Impact-type injectors have further been proposed (see U.S. Pat. No. 4,434,049) which employ mechanical means for atomization of the feedstock; however, the quality of atomization of the feedstock is not nearly as good for a given energy input.

SUMMARY OF THE INVENTION

The present invention seeks to remedy these drawbacks by proposing a device for injection of a hydrocarbon feedstock into a catalytic cracking reactor which entails only a slight drop in injection pressure, atomizes the feedstock into very fine droplets, and injects it with high velocity into the reactor without risk of erosion of the injector or attrition of the catalyst downstream of the injector.

To this end, the invention has as a preferred embodiment a device for injection of a hydrocarbon feedstock into a catalytic cracking reactor comprising, from upstream to downstream in the direction of flow of the hydrocarbon feedstock, a system for the intake and mixing of the liquid hydrocarbon feedstock and steam, a venturi tube whose entrance cone is joined to said intake and mixing system, and a protective cap that is integral with the discharge cone of the venturi tube and is provided with an orifice for injection of the feedstock into the reactor, said device being characterized in that the dimensions of the venturi tube are such that the velocity of the mixture of liquid feedstock and steam attains therein sonic conditions at the level of the throat (so as to atomize liquid feedstock into droplets of less than 120 microns in diameter); that the rectilinear throat, located between the entrance, and discharge cones, is connected to them by a continuously curved section without making an angle exceeding about 5 degrees and about 15 degrees, respectively, with the axis of the venturi tube; and that the surface area of the injection orifice in the protective cap is from 1.5 to 10 times, and preferably from 2 to 5 times, that of the throat of the venturi tube.

As will be seen further on, this combination of features results in the atomization of the feedstock into droplets of a very small diameter, which may be of the order of 30 microns on the average, and permits its injection into the reactor with a very high velocity that may be as high as 150 meters/second without risking an appreciable reintroduction of catalyst particles into the venturi tube, which would entail pronounced erosion and a shortened service life of the venturi tube.

In particular, the presence of a protective cap with an injection orifice of reduced cross-sectional area at the end of the discharge cone reduces the risk of penetration of catalyst particles into the injection device. Moreover, the curved section of the venturi tube and the limitation of the angles of its discharge and entrance cones to the values specified prevent fluid stream lines from separating. Consequently, if catalyst particles do penetrate into the device, they are not entrained by backflow currents but are, on the contrary, immediately returned into the reactor.

The injection device in accordance with the invention thus is distinguished from the prior-art devices by the following advantages:

An extended service life because of less wear due to catalyst particles;

improved efficiency since the feedstock droplets only have a diameter ranging from about 10 to about 50 microns and are injected with velocities of from 60 to 150 meters/second;

a relatively small pressure drop at the level of the injector;

negligeable risk of clogging since the sonic conditions result in high velocity at the level of the throat of the venturi tube; and practically instantaneous vaporization of the feedstock in the reactor, resulting in improved cracking efficiency and reduced coke deposition on the catalyst particles.

The feedstock may be introduced into the reactor in the form of a jet, generally in the direction of flow of the catalyst, at an angle of from 20 to 40 degrees therewith.

Mixing of the catalyst in a fluidized bed and of the injected feedstock will occur the more readily and intimately the higher the velocity with which the feedstock is injected. With the injection device in accordance with the invention, this injection velocity will be very much higher than what it is in the usual fluid catalytic cracking processes. Because of the small diameter of the hydrocarbon droplets, heat transfer and vaporization take place practically instantaneously. Moreover, better control of the time of contact between the catalyst and the vaporized hydrocarbons is now possible, which is important when it is desired to limit that contact time to a few seconds or to just a fraction of a second.

The feedstock is preferably injected into the reactor by means of a plurality of injectors disposed at the same level and distributed uniformly over the periphery of the reactor. For example, from 2 to 12 feedstock injectors may be used, depending on the characteristics of the fluidized-bed cracking reactor.

The shape of the orifice in the protective cap of the device will be determined by the geometry of the reactor, the number of injectors, their disposition, etc. Depending on the circumstances, the orifice may be circular, oval, or a slit. The protective cap may advantageously be dome-shaped, and the orifice may be provided as usual with lips designed to shape the jet of feedstock to be cracked which is being sprayed into the reactor. If necessary, the orifice may even consist of one or more tubes, whose total cross-sectional area will then necessarily be from 1.5 to 10 times that of the throat of the venturi tube. In accordance with a preferred though by no means limitative embodiment of the invention, the orifice from which the droplets exit may be a simple slit disposed in a plane of symmetry of the dome, and injection into the reactor may then take the form of a flat triangular jet that will contribute to the rapid and uniform contacting of the feedstock to be cracked with the catalyst. The included angle of the jet may advantageously range from 60 to 90 degrees.

Thus, as stated above, the injection device of the invention comprises a system for the intake and mixing of the hydrocarbon feedstock and of an atomizing gas, which may advantageously be steam or any other acceptable gaseous phase. Said system may comprise, for example, two concentric tubes, the inner tube carrying steam and the peripheral annular space serving as passage for the feedstock, or vice versa, as the case may be, and the outer tube being joined to the venturi tube while the inner tube may terminate upstream or at the level of the entrance cone of the venturi tube.

To prevent any separation of the mixture of feedstock and steam from the walls and to thus eliminate any deleterious penetration of catalyst into the feedstock injector, the venturi tube has no sharp edges, and its entrance and discharge cones are connected to the throat through continuous curved sections having a radius of curvature of from 2 to 3 meters. The discharge cone makes an angle with the axis of about 3 degrees overall, and the entrance cone, an angle of about 12 degrees.

The diameter of the rectilinear throat of the venturi tube will be such, allowing for the superheated-steam and hydrocarbon-feedback intake conditions (flow rate and pressure), that the injector operates in critical flow, that is to say, that the overall mass flow rate is no longer dependent on the difference in pressure between the upstream and downstream sides of the venturi tube but is dependent solely on the upstream pressure. In the terminology of those skilled in the art in the U.S. of supersonic flow through venturi nozzles, the term critical flow is better known as the choking point. Thus, atomization of the liquid feedstock into very fine droplets is obtained whose diameter may be as small as 30 microns, as against 500 microns with the conventional system. Experience has shown that, all other conditions being equal, droplets of very small diameter are able to vaporize in the reactor in less than about 3 milliseconds, whereas the 500-micron droplets from the usual injectors require about 230 milliseconds under identical conditions. The zone of mass and heat transfer then is reduced from 150 to 3 centimeters, and it is obvious that the likelihood of liquid fractions depositing on the catalyst before being vaporized and cracked is reduced as well.

Experience has further shown that the diameter of the droplets obtained at the discharge end of the venturi tube varies inversely as the ratio between the mass flow rate of steam and the minimum passage section $S_c$ (throat) of the venturi tube.

The flow rates of the liquid feedstock and of the atomizing gas being fixed, the diameter of the throat will be calculated on the basis of the relationship existing between the upstream pressure and the mass flow of liquid and gas at the throat.

The nominal flow rate of the feedstock is normally established by external factors (characteristics of the process, capacity of other equipment components of the unit, etc.), and the flow rate of the atomizing steam consequently depends on that of the feedstock.

The diameter of the downstream end of the discharge cone of the venturi tube will be sized so that the velocity of the steam/hydrocarbon mixture ranges from 30 to 150 meters/second, and preferably from 30 to 120 meters/second, so as to prevent attrition of the catalyst in suspension by the jet issuing from the cap, especially since the latter will reaccelerate the mixture as it leaves the discharge cone.

The length of the throat of the venturi tube will generally be from 1 to 10 times its diameter.

Other dimensional characteristics of the venturi tube, of the intake and mixing system, and of the cap will be apparent from the detailed description which follows of an injector in accordance with the invention.

Said injector may be used both with new fluidized-bed catalytic cracking reactors and with renovated old units. In such renovated units, the pressures available for the feedstock and for the steam are lower than in new units, but it will still be possible to obtain very satisfactory performances (droplet diameters of less than 120 microns).

The injector of the invention is conventionally mounted in the wall of the reactor through a sleeve with interposition of a heat-insulating material.

BRIEF DESCRIPTION OF THE DRAWINGS

An embodiment of such an injector is illustrated in the accompanying drawings, which are not limitative, and wherein.

DESCRIPTION OF THE PREFERRED EMBODIMENT

Figure 1:
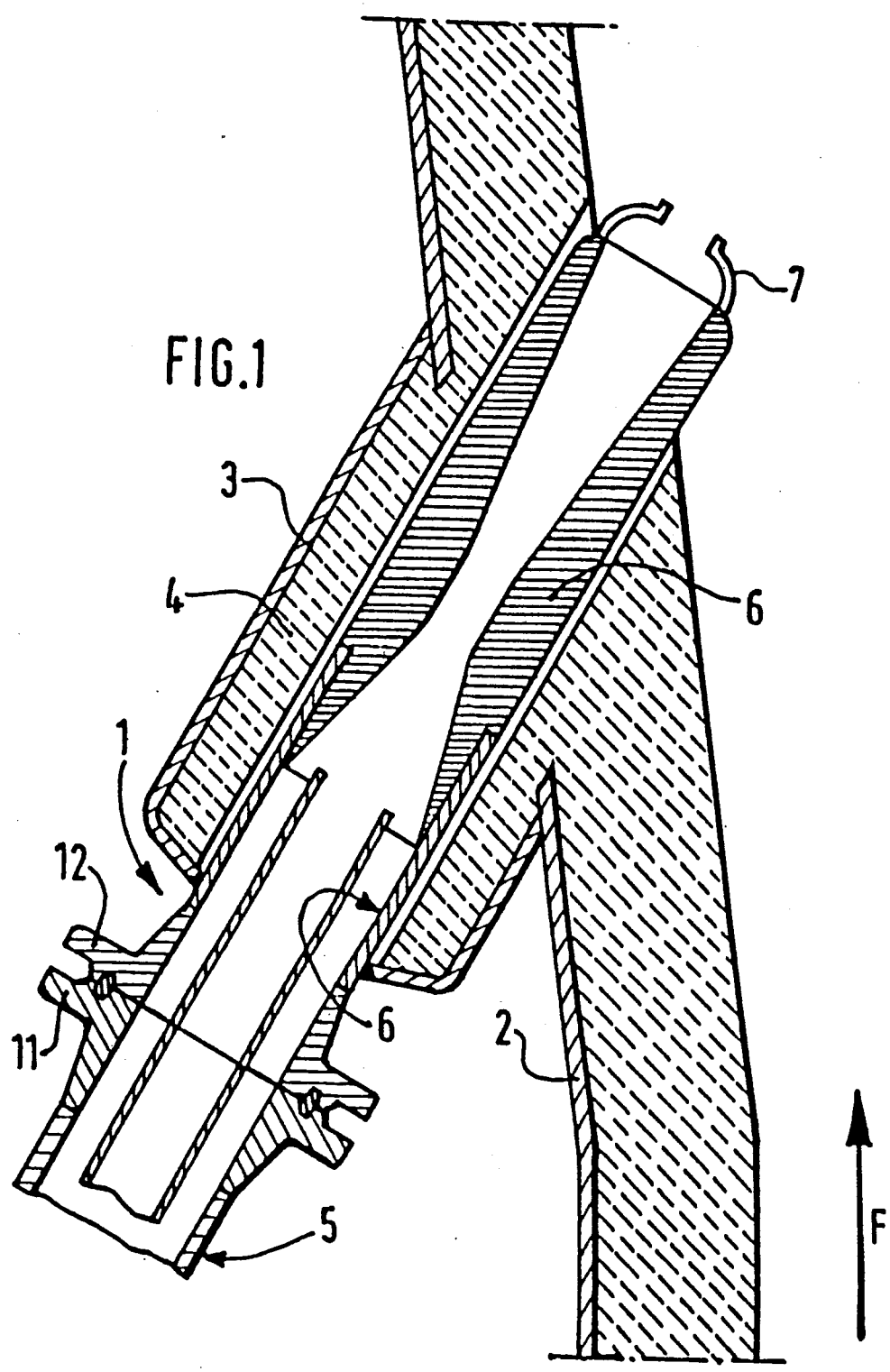
FIG. 1 is a diagrammatic section showing how the injector in accordance with the invention is mounted in the wall of the reactor.

The feedstock injector shown in FIG. 1, designated by the general reference numeral 1, traverses the wall 2 of the reactor and is secured thereto by means of a sleeve 3 with a heat-insulating material 4.

The injector 1 essentially consists of three parts, namely:

An intake and mixing system 5;
a venturi tube 6 or any other converging-diverging assembly; and
a cap 7.

Figure 2:
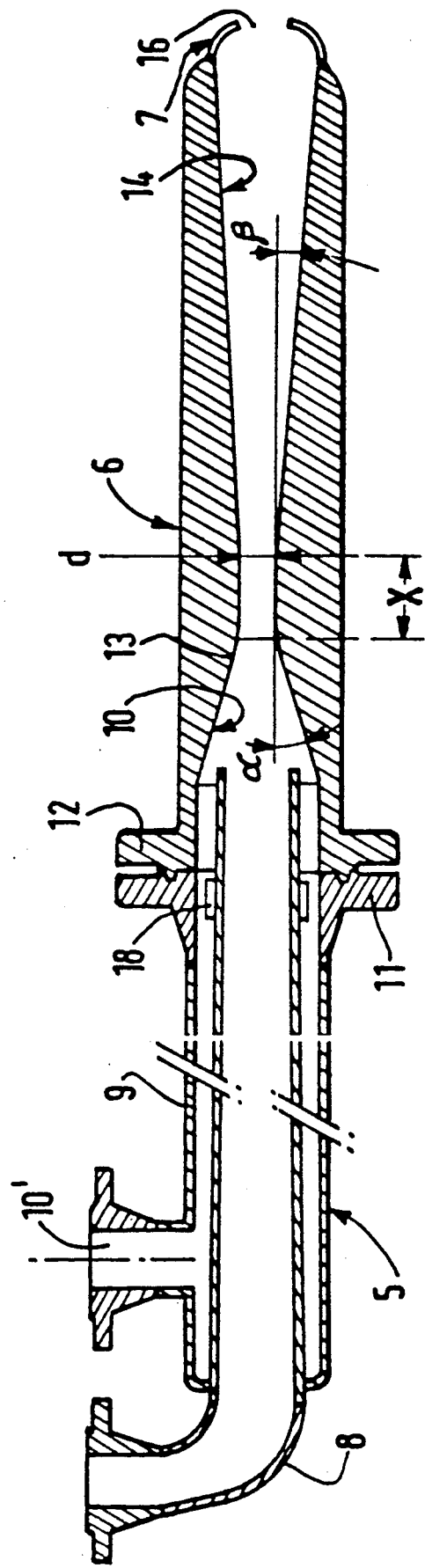
FIG. 2 is a sectional view of the injector and of its intake and mixing system.

The intake and mixing system 5, illustrated in FIG. 2, comprises two concentric tubes, namely, an inner tube 8 serving to convey the liquid hydrocarbon feedstock to be treated, and a second, outer tube 9 which is laterally supplied, at 10', with superheated steam which then circulates between the tubes 8 and 9.

The mixing system serves a dual purpose, namely,
to assure mixing of the feedstock and steam in such a way that turbulence and pressure drops are minimized, and
to effect such mixing close to the entrance cone 10 of the venturi tube 6 that is joined to this system, with a view to avoiding possible problems of condensation of the steam on contact with the colder feedstock.

The feedstock inlet tube 8 projects into the venturi tube 6 and terminates directly upstream of the entrance cone 10.

Tube 9 and the venturi tube 6 are joined by means of flanges 11 and 12, respectively. Fins 18 provide for the centering of tube 8 at the flange 11.

In dimensioning the tubes 8 and 9, the velocity of the hydrocarbon feedstock, which generally ranges from 1 to 10 meters/second, and that of the steam, ranging from 10 to 80 meters/second, should be taken into consideration.

The venturi tube 6, which comprises an entrance cone 10, a rectilinear throat 13, and a discharge cone 14, represents an important component of the injector of the invention. Its purpose is to accelerate the liquid feedstock mixed with superheated steam to a pseudo-critical velocity at the level of the throat 13 to bring about its breakup into very fine droplets of a diameter of less than about 120 microns and of an average diameter of from 30 to 50 microns. Moreover, it should impart to the mixture formed by these droplets and steam a velocity of from 30 to 150 meters/second as it exits from the discharge cone 14.

The length x of the rectilinear throat preferably is substantially five times the diameter d of the throat.

The entrance cone 10 and the discharge cone 14 are connected to the throat 13 in an unbroken manner by a continuous curved section with a radius of from 2 to 3 meters, free from discontinuities that could cause a separation of fluid stream line from the inner walls of the venturi tube, which would have the effect of producing turbulence conducive to the entry of catalyst particles resulting in erosion of the walls of the discharge cone 14.

The angle of the entrance cone 10 should be on the order of from 10 to 15 degrees overall, and the angle of the discharge cone 14, on the order of from 2 to 5 degrees overall.

Attached to the end of the discharge cone is a dome-shaped cap 7 which here comprises, in a diametral plane, an aperture 16 designed to inject the feedstock of hydrocarbon droplets into the reactor in the form of either a cone or a substantially flat beam. The angle of the jet issuing from the injector depends, of course, as usual on the geometry of the aperture and of the injection zone as well as on the operating conditions of the reactor and on the number of injectors used.

The velocity with which the hydrocarbon droplets leave the cap preferably ranges from 30 to 120 meters/second, and the droplets are preferably injected into the reactor in such a way that they cover its cross-sectional area as uniformly as possible. As a rule, and as usual, from 2 to 12 injectors disposed at the same level and directed in the direction of motion of the catalyst bed (arrow F in FIG. 1), making an angle of from about 20 to 90 degrees with the axis of the reactor, will be employed.

The high velocity of injection of the feedstock and the very small size of the hydrocarbon droplets facilitate their complete vaporization within a few milliseconds.

We claim:

1. A device for injecting with steam a liquid hydrocarbon feedstock as a finely atomized stream into a fluidized bed catalytic cracking reactor comprising an intake and mixing system for the liquid hydrocarbon feedstock and steam; a venturi tube having an entrance cone fed by said intake and mixing system, a discharge cone, and a rectilinear throat between said cones; a protective cap that is integral with the discharge cone of the venturi tube and having an orifice for injection of the feedstock into the reactor; the dimensions of the venturi tube being such that the velocity of a mixture of liquid feedstock and steam fed from said system is capable of attaining therein critical flow at the level of the throat sufficient to atomize feedstock into fine droplets of a diameter of less than about 120 microns with an average diameter on the order of 30 to 50 microns; the rectilinear throat of the venturi tube located between the discharge cone and the entrance cone being connected to said cones by a continuously curved section without making an angle exceeding about 5 degrees and about 15 degrees, respectively, with the central axis of the venturi tube; the surface area of the injection orifice in the protective cap being from 1.5 to 10 times that of the throat of the venturi tube.

2. A device according to claim 1, wherein the surface area of the injection orifice is from 2 to 5 times that of the throat of the venturi tube.

3. A device according to claim 1, wherein said intake and mixing system comprise two concentric tubes, one of which is connected to a hydrocarbon inlet, and the other to a steam inlet.

4. A device according to claim 3, wherein the inner

5. A device according to claim 1, wherein the venturi tube has no sharp edges in its axial section; the connecting portions of the throat with the entrance cone and the discharge cone have radii of curvature of from 2 to 3 meters; and the entrance cone of the venturi tube makes an angle $9\alpha$) with the axis of the latter of from about 10 to 15 degrees; and that the discharge cone of the venturi tube makes an angle ($\beta$) with the axis of the latter of from about 2 to 5 degrees.

6. A device according to claim 5, wherein the length of the throat of the venturi tube is about 1 to 10 times its diameter.

7. A device according to claim 6, wherein the diameter of the downstream end of the discharge cone of the venturi tube is such that the velocity of the mixture of steam and hydrocarbon droplets t such end is capable of ranging from about 60 to 150 meters/second to give droplets with a diameter ranging from about 10 to 50 microns.

8. A device according to claim 7, wherein the cap is dome-shaped, and the injection orifice in the cap has the shape of a slit disposed along a diametral plane of the cap.

9. A device according to claim 8, wherein said slit occupies a circular sector of the cap ranging from 60 to 90 degrees.

10. A device according to claim 1, wherein the length of the throat of the venturi tube is about 1 to 10 times its diameter.

11. A device according to claim 1, wherein the diameter of the downstream end of the discharge cone of the venturi tube is such that the velocity of the mixture of steam and hydrocarbon droplets at such end is capable of ranging from about 30 to 150 meters/second.

12. A device according to claim 1, wherein the cap is dome-shaped, and the injection orifice in the cap has the shape of a slit disposed along a diametral plane of the cap.

13. A device according to claim 12, wherein said slit occupies a circular sector of the cap ranging from 60 to 90 degrees.

14. A device according to claim 11, wherein said venturi tube is dimensioned such that feedstock is atomized into droplets on the order of 30 microns on average; and wherein the venturi tube has inner walls which are free of discontinuities so as to prevent separation of fluid stream lines from said walls.

15. In a fluidized bed catalytic cracking reactor having a wall adapted to contain a rising fluidized bed of catalytic cracking particles with at least one device for injecting with steam a liquid hydrocarbon feedstock as a finely atomized stream into such fluidized bed in such reactor, the improvement in which said device comprises:

an intake and mixing system for the liquid hydrocarbon feedstock and steam; a venturi tube having an entrance cone fed by said intake and mixing system, a discharge cone, and a rectilinear throat between said cones; a protective cap that is integral with the discharge cone of the venturi tube and having an orifice for injection of the feedstock into the reactor; the dimensions of the venturi tube being such that the velocity of a mixture of liquid feedstock and steam fed from said system is capable of attaining therein critical flow at the level of the throat sufficient to atomize feedstock into fine droplets of a diameter of less than about 120 microns with an average diameter on the order of 30 to 50 microns; the rectilinear throat of the venturi tube located between the discharge cone and the entrance cone being connected to said cones by a continuously curved section without making an angle exceeding about 5 degrees and about 15 degrees, respectively, with the central axis of the venturi tube; the surface area of the injection orifice in the protective cap being from 1.5 to 10 times that of the throat of the venturi tube; and said device being mounted through a wall of said reactor such that the axis of the injector makes an angle of from 20 to 90 degrees with the axis of the reactor in the direction of flow for the fluidized bed of catalyst through said reactor.

16. The reactor according to claim 15, wherein the venturi tube has no sharp edges in its axial section;

the connecting portions of the throat with the entrance cone and the discharge cone have radii of curvature of from 2 to 3 meters;

the entrance cone of the venturi tube makes an angle ($\alpha$) with the axis of the latter of from about 10 to 15 degrees; and that the discharge cone of the venturi tube makes an angle ($\beta$) with the axis of the latter of from 2 to 5 degrees;

the length of the throat of the venturi tube is about 1 to 10 times its diameter; and the diameter of the downstream end of the discharge cone of the venturi tube is such that the velocity of the mixture of steam and hydrocarbon droplets at such end is capable of ranging from about 60 to 150 meters/ second to give droplets with a diameter ranging form about 10 to 50 microns.

17. The reactor according to claim 16, wherein said cap is dome-shaped;

the injection orifice in the cap has the shape of a slit disposed along a diametral plane of the cap; and said slit occupies a circular sector of the cap ranging from 60 to 90 degrees.

* * * * *